(12) United States Patent
Tsai

(10) Patent No.: US 7,174,805 B2
(45) Date of Patent: Feb. 13, 2007

(54) CROSS RACING BIKE FRONT BRAKE LEVER

(75) Inventor: Szu-Fang Tsai, Chang-Hua Hsien (TW)

(73) Assignee: Tektro Technology Corporation, Changhua Hsien (TW)

( * ) Notice: Subject to any disclaimer, the term of this patent is extended or adjusted under 35 U.S.C. 154(b) by 375 days.

(21) Appl. No.: 10/835,117

(22) Filed: Apr. 30, 2004

(65) Prior Publication Data

US 2005/0241428 A1    Nov. 3, 2005

(51) Int. Cl.
*G05G 1/04* (2006.01)
(52) U.S. Cl. ........................................ 74/523; 74/502.2
(58) Field of Classification Search ................. 74/523, 74/524, 525, 502.2, 489, 526
See application file for complete search history.

(56) References Cited

U.S. PATENT DOCUMENTS

| | | | | |
|---|---|---|---|---|
| 4,840,082 A | * | 6/1989 | Terashima et al. | 74/523 |
| 5,247,850 A | * | 9/1993 | Lenzke | 74/523 |
| 6,393,935 B1 | * | 5/2002 | Chen | 74/523 |

* cited by examiner

*Primary Examiner*—Richard M. Lorence
*Assistant Examiner*—Edwin A. Young
(74) *Attorney, Agent, or Firm*—Leong C. Lei

(57) ABSTRACT

A cross-racing bike brake lever has on its contact surface external to the grip of the brake lever provided with multiple recesses for the fingers of the rider to hold against while executing a hand brake on the inner side of the grip so that the rider comfortably moves his or her fingers to rest flushed on the recesses and holds against the inner side of the grip with fingers at where close to their joint of the fingertips to execute an easy, sure and comfortable hand brake for improved safety.

1 Claim, 4 Drawing Sheets

CROSS RACING BIKE FRONT BRAKE LEVER

BACKGROUND OF THE INVENTION (a) Technical Field of the Invention

The present invention is related to a cross racing bike front brake lever and more particularly, to one provides a safe and convenient brake lever suited to a cross racing bike.

(b) Description of the Prior Art

As its designation suggests, a cross-racing bike is for speedy riding, and is characterized by that the handle is provided low and curved backward for the rider to keep low profile to minimize drag while riding. Accordingly, it is essential to have the optimal design and structure for the brake lever adapted to the bike. The brake lever generally found with a cross-racing bike has a curved style with smooth surface and is erected outside the lower curved portion of the handle.

However, for the rider seeking to challenge the extreme of speed, he or she has much more demand for a brake lever that has a streamlined style and smooth surface, but also allows easy, safe and comfortable grip.

SUMMARY OF THE INVENTION

The primary purpose of the present invention is to provide a cross-racing bike brake lever that permits an easy and secured hand brake for improved safety. To achieve the purpose, the contact surface of fingers on the outer side of the grip of the brake lever is provided with multiple recesses for the fingers to touch so that the rider is able to have fingers comfortably slide flushed into those recesses while holding against the inner surface with the joints of fingertips to execute the hand brake.

Another purpose of the present invention is to provide a cross-racing bike brake lever that has the length of the cross section of the contact surface greater than that for the fingers to hold against the brake lever so to facilitate the execution of a hand brake for the fingers to hold against the brake lever.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
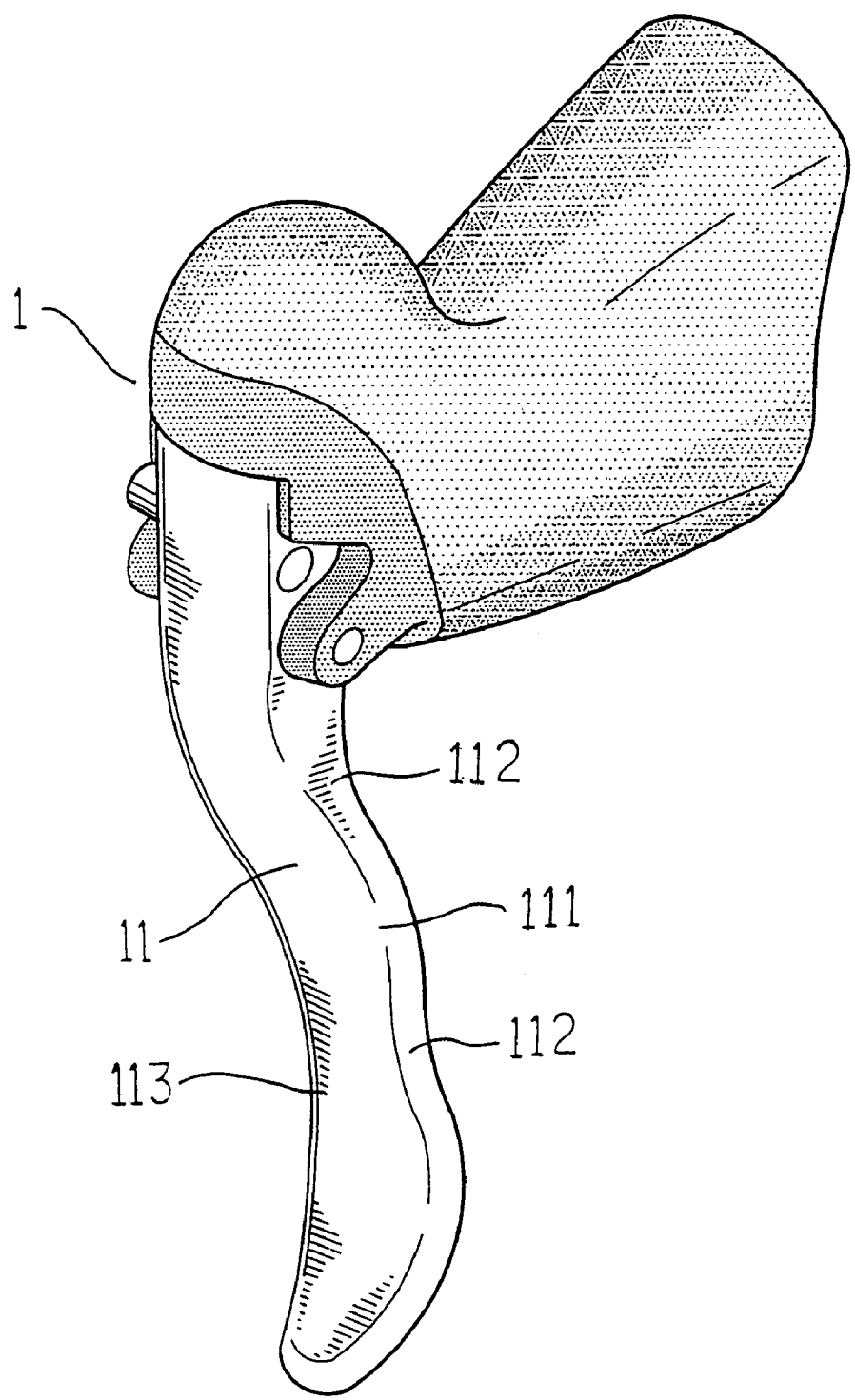
FIG. 1 is a perspective view of the present invention.
Figure 2:
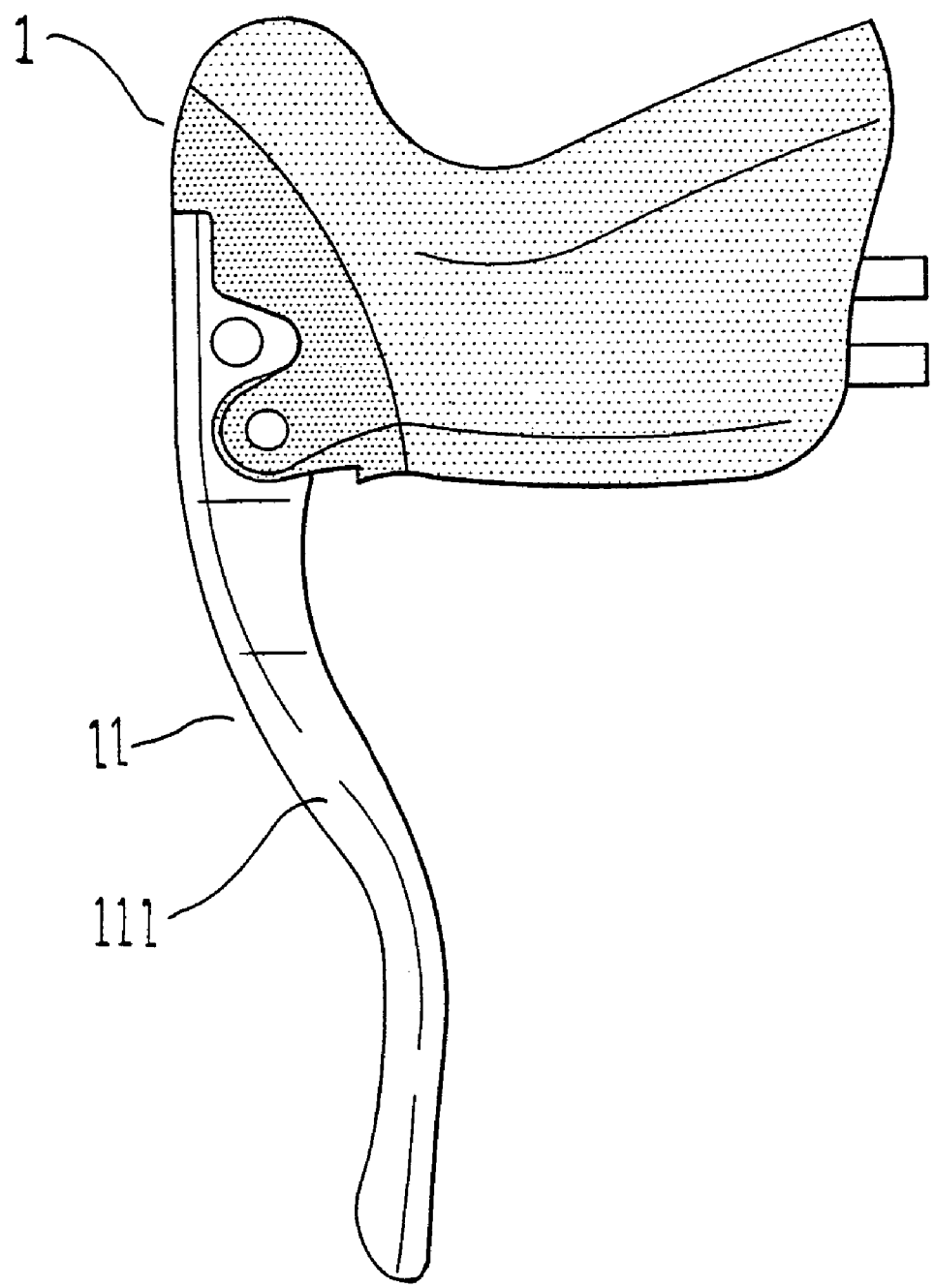
FIG. 2 is a right side view of the present invention.
Figure 4:
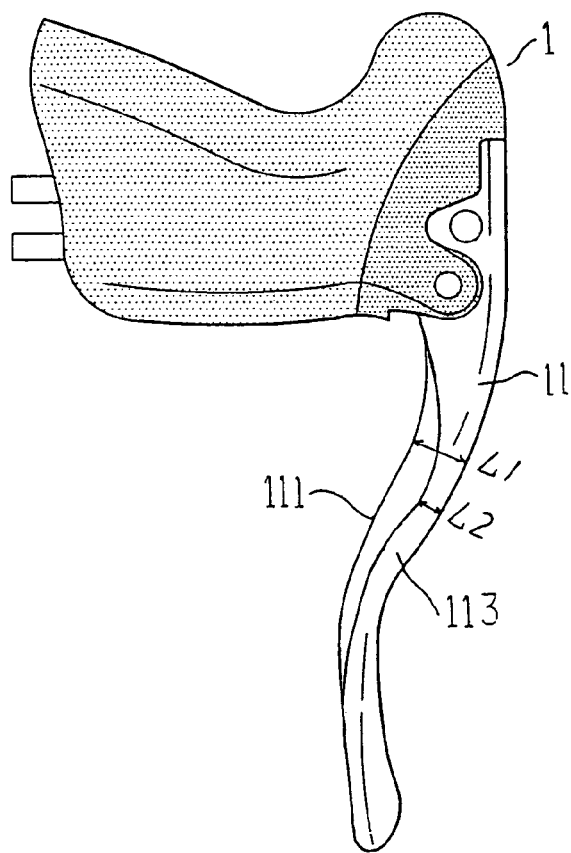
FIG. 4 is a left side view of the present invention.
Figure 4:
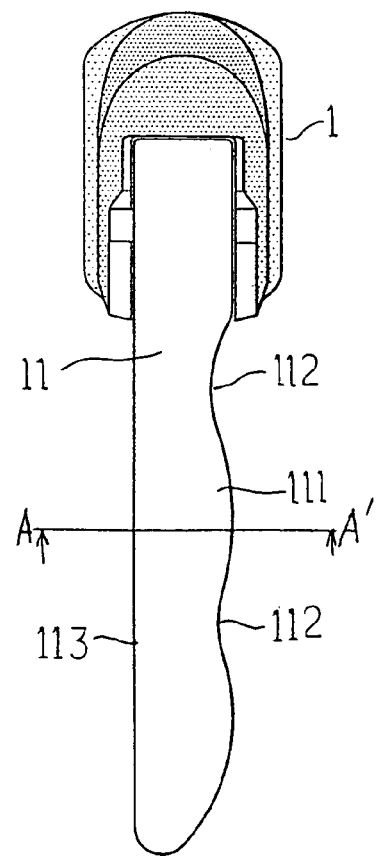
Figure 3:
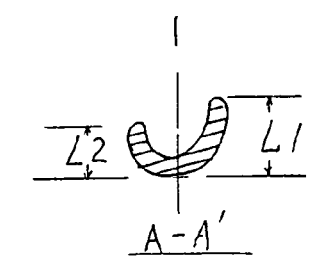
FIG. 3 is a front view of the present invention.
Figure 5:
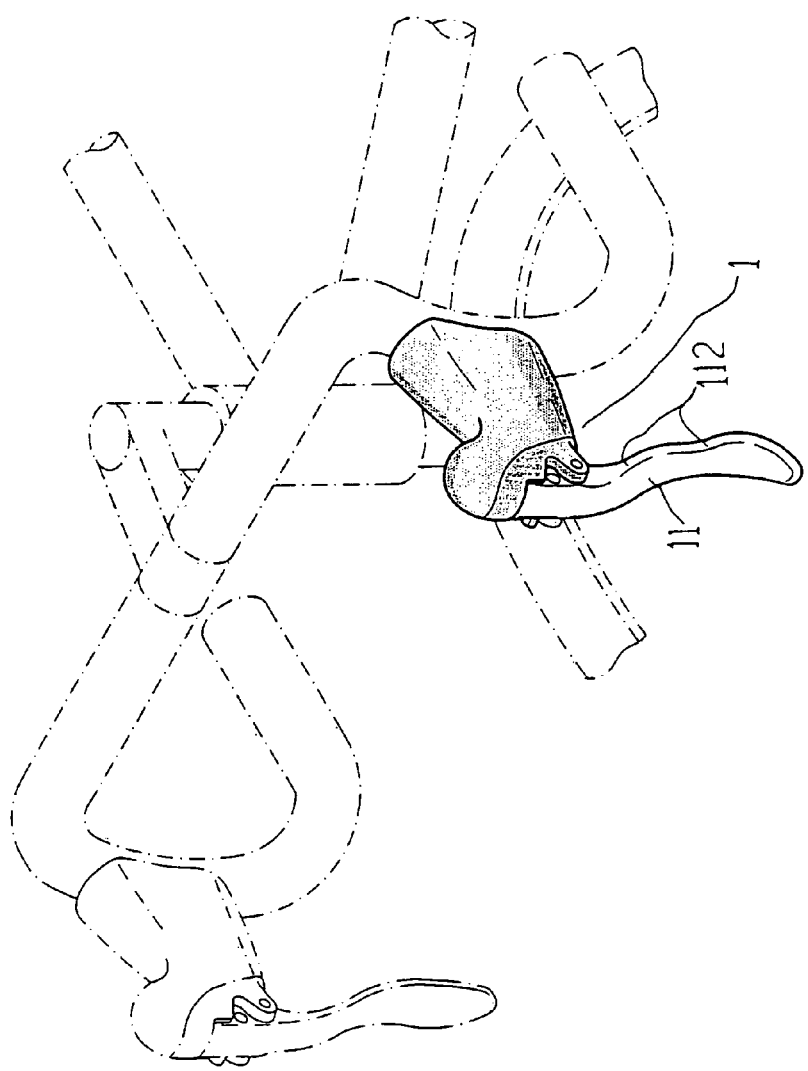
FIG. 5 is a schematic view showing the present invention in use.

Referring to FIGS. 1 through 5, an improved structure of a cross-racing bike brake lever 1 according to the present invention has a grip 11 having an outer lateral side and an inner lateral side. The outer lateral side has a contact surface 111 formed with multiple recesses 112 for fingers of the rider to rest on. The inner lateral side of the grip 11 defines an operation surface 113 for the distal phalanxes to execute a hand brake by holding against the operation surface. Accordingly, the rider while executing a hand brake has fingers to forthwith slide onto those recesses 112 on the contact surface 111 and holds against the operation surface 113 with distal phalanxes to achieve an easy, secured and comfortable hand brake for improved safety.

Furthermore, the grip 11 has a longitudinal center line and a U-shaped cross section, wherein the contact surface 111 has a length L1 from the longitudinal line and the operation surface 113 has a length L2 from the longitudinal line. The length L1 is longer than that the length L2 to facilitate the flushed rest of the fingers thereon to grip the brake lever 1.

The present invention by providing multiple recesses to compromise the grip by fingers of the rider and an operation surface on the inner side of the brake lever to facilitate the execution of the hand brake with distal phalanxes to achieve easy, safe and comfortable hand brake is complying with ergonomics and meets the requirements of a utility patent. Therefore, this application is duly filed accordingly.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A cross racing bike brake lever comprising a grip having an outer lateral side and an inner lateral side, said outer lateral side being formed with a contact surface, said contact surface being formed with a plurality of recesses for receiving fingers, said inner lateral side having an operation surface for distal phalanxes to execute a hand brake by holding against said operation surface, said grip having a longitudinal center line and a U-shaped cross section, said contact surface having a longer length from said longitudinal center line than said operation surface from said longitudinal center line.

* * * * *